United States Patent [19]

Cooke et al.

[11] Patent Number: 4,541,979
[45] Date of Patent: Sep. 17, 1985

[54] PROCESS AND APPARATUS FOR MANUFACTURING OPTICAL CABLE ELEMENTS

[75] Inventors: Edward I. Cooke, Addington; Arthur J. Pinnington, Widnes; Charles A. Smeatham, Chester, all of England

[73] Assignee: BICC plc, London, England

[21] Appl. No.: 451,649

[22] Filed: Dec. 20, 1982

[30] Foreign Application Priority Data

Dec. 22, 1981 [GB] United Kingdom ............... 8138545

[51] Int. Cl.⁴ ............................................. B29F 3/10
[52] U.S. Cl. ..................... 264/174; 264/1.5; 264/209.5; 264/235.6; 264/346; 425/114
[58] Field of Search ............ 264/1.5, 174, 173, 209.1, 264/209.3, 209.5, 235, 235.6, 346; 425/808, 114, 384, 72 R

[56] References Cited

U.S. PATENT DOCUMENTS

| | | | |
|---|---|---|---|
| 3,829,545 | 8/1974 | Van Vlaenderen | 264/174 |
| 3,886,253 | 5/1975 | Friendship | 264/235 |
| 4,069,286 | 1/1978 | Greenhalgh | 264/174 |
| 4,154,783 | 5/1979 | Jackson | 264/1.5 |

Primary Examiner—Jay H. Woo
Assistant Examiner—Mike McGurk
Attorney, Agent, or Firm—Buell, Ziesenheim, Beck & Alstadt

[57] ABSTRACT

In the manufacture, for use in an optical cable element, of a tube of polymeric material, the drawn down extruded polymeric tube is annealed by causing it to travel through at least one elongate oven into which is injected, at a position intermediate of the ends of the oven, air or other gas which will have no deleterious effect on, and which is at a temperature sufficient to effect annealing of, the drawn down polymeric tube, and by directing the injected hot air or other gas on to the advancing drawn-down tube at a plurality of positions spaced along the length of the oven in such a way that turbulent flow and substantially even distribution of hot gas is provided around the advancing drawn-down tube. Use of this method of annealing enables the speed of manufacture to be at least twice the speed of manufacture hitherto achieved.

9 Claims, 2 Drawing Figures

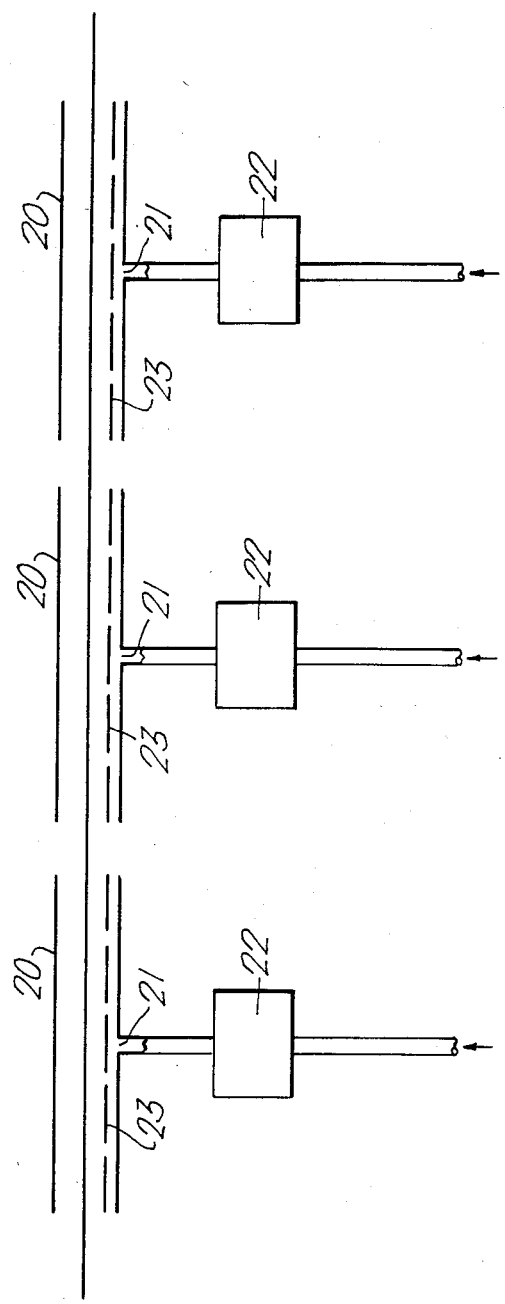

PROCESS AND APPARATUS FOR MANUFACTURING OPTICAL CABLE ELEMENTS

Light, which term includes the ultra violet, visible and infra-red regions of the electromagnetic spectrum, is transmitted in an optical transmission system by means of optical guides in the form of cables including one or more than one optical fiber.

One form of optical cable that is especially, but not exclusively, suitable for use in the communication field for transmission of light having a wavelength within the range 0.8 to 2.1 micrometers includes a plurality of optical cable elements each comprising a separately formed tube of rubber or plastics material in some or all of which is or are loosely housed at least one separate optical fiber and/or at least one optical bundle comprising a group of optical fibers.

An optical cable element comprising a separately formed tube of rubber or plastics material loosely housing at least one separate optical fiber and/or at least one optical bundle comprising a group of optical fibers will hereinafter be referred to as "an optical cable element of the kind described".

A known method of manufacturing an optical cable element of the kind described comprises causing an optical fiber to travel in a rectilinear direction in the direction of its length under a controlled tension; extruding a tube of polymeric material around the advancing optical fiber in such a way that the internal diameter of the tube is substantially greater than the diameter of the optical fiber; drawing down the extruded tube of polymeric material to reduce its internal diameter to such an extent that the tube loosely envelops the optical fiber; and annealing the drawn-down tube to reduce the risk of subsequent substantial shrinkage of the tube.

An optical cable element of the kind described whose separately formed rubber or plastics tube loosely houses an optical bundle comprising a group of optical fibers is made by causing two or more separate optical fibers to travel in a rectilinear direction in the direction of their lengths each under a controlled tension; assembling the advancing optical fibers together in such a way as to form an optical bundle in which the positions of the optical fibers relative to one another are substantially constant; extruding a tube of polymeric material around the advancing optical bundle in such a way that the internal diameter of the tube is substantially greater than the overall diameter of the bundle; drawing down the extruded tube of polymeric material to reduce its internal diameter to such an extent that the tube loosely envelops the optical bundle; and annealing the drawn-down tube to reduce the risk of subsequent substantial shrinkage of the tube.

For convenience, the known method of manufacturing an optical cable element of the kind described whose separately formed rubber or plastics tube loosely houses a separate optical fiber and the known method of manufacturing an optical cable element of the kind described whose separately formed rubber or plastics tube loosely houses an optical bundle will be included in the generic expression "a method as hereinbefore specified of manufacturing an optical cable element of the kind described".

The present invention provides an improved method of manufacturing a tube of polymeric material for use in an optical cable, which method enables the speed of manufacture of the polymeric tube to be substantially increased as compared with other methods of manufacture hitherto proposed and used.

According to the invention the improved method comprises extruding a tube of polymeric material; drawing down the extruded tube of polymeric material to reduce its internal diameter; causing the drawn-down tube to travel in the direction of its length through at least one elongate oven injecting a gas, which will have no deleterious effect on, and which is at a temperature sufficient to effect annealing of, the drawn-down tube, into the oven at at least one position intermediate of its ends; and directing the injected hot gas on to the advancing drawn-down tube at a plurality of positions spaced along the length of the oven in such a way that turbulent flow and substantially even distribution of hot gas is provided around the advancing drawn-down tube. Hot gas ejected from (the/or each) elongate oven may be re-heated and re-introduced into (the/or each) oven.

Preferably, to effect turbulence and a substantially even distribution of hot air or other hot gas within the or each elongate oven, there is provided between the inlet port which is intermediate of the ends of the oven and through which the hot air or other hot gas is injected and the advancing drawn-down tube, an elongate perforated baffle which extends throughout substantially the whole length of the oven.

In a preferred embodiment, the drawn-down tube is caused to travel in the direction of its length through at least three elongate ovens arranged in substantial alignment one with another and, preferably, hot gas is injected into each oven at a position approximately midway between its ends.

Where, as is preferred, the drawn-down tube is of polyethylene terephthalate, preferably the hot gas is air which is injected into the or each elongate oven at a temperature of approximately 250° C. Where the drawn-down tube is of polypropylene, preferably the hot gas is air which is injected at a temperature of approximately 180° C.

The improved method of annealing the drawn-down tube has the important advantage that the temperature of the air or other gas injected into the or each elongate oven can be substantially the same as the temperature to which the drawn-down tube is to be heated to effect the annealing process. This is because the turbulent flow of the hot air or other hot gas breaks down the static film of air on the drawn-down tube and, consequently, hot air or other hot gas is brought continuously in contact with the advancing tube, thereby raising the temperature much more quickly and leading to an annealing process that is substantially more efficient than annealing processes hitherto proposed and used. As a result, when employing elongate ovens of substantially the same length as elongate electrically heated annealing ovens hitherto used, the speed of manufacture of a tube of polymeric material can be at least twice the speed of manufacture hitherto achieved. Furthermore, the improved method of annealing does not have the serious risk present when employing electrically heated annealing ovens, when it is necessary to raise the temperature of the ovens to 350° C. to 400° C. in order to anneal the drawn-down tube, in that should the tube accidentally touch a wall or the bottom of the oven, the process would immediately be aborted and would have to be re-started.

The invention also includes apparatus for use in the manufacture by the improved method hereinbefore specified of manufacturing a tube of polymeric material.

The improved method of manufacturing a tube of polymeric material has especial, but not exclusive, application in a method as hereinbefore specified of manufacturing an optical cable element of the kind described.

Where the method as hereinbefore specified of manufacturing an optical cable element of the kind described is to be used to manufacture an optical cable element comprising a tube of polymeric material loosely housing an optical bundle comprising a group of optical fibers, it is to be understood that the expression "optical bundle" as used in this specification includes a plurality of optical fibers helically wound about a central elongate core, a plurality of optical fibers arranged side-by-side and at least partially embedded in encapsulating material, and a plurality of optical fibers supported side-by-side on a surface of a flexible tape or between surfaces of a pair of flexible tapes.

The invention is further illustrated by a description, by way of example, of the preferred method of making an optical cable element of the kind described, with reference to the accompanying diagrammatic drawings, in which:

FIG. 2 is a side view of the annealing ovens used in the apparatus shown in FIG. 1.

Figure 1:
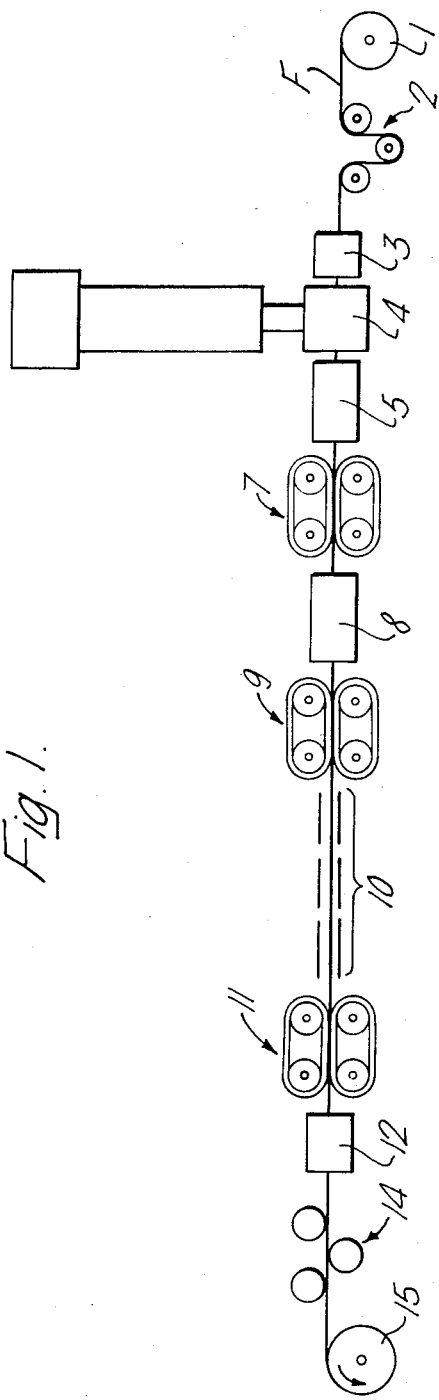
FIG. 1 shows a schematic lay out of the apparatus employed.

Referring to the drawings, the apparatus comprises a pay-off reel 1, a tension control device 2, and a powder applicator 3. Downstream of the powder applicator 3 is an extrusion machine 4 having, adjacent the extrusion orifice, a trough 5 of cooling water. Three pairs of endless belt haul-off devices 7, 9 and 11 are positioned downstream of the cooling trough 5. A heated water bath 8 is positioned between the endless belt haul-off devices 7 and 9 and annealing ovens 10 are positioned between the endless belt haul-off devices 9 and 11. A second trough 12 of cooling water is positioned downstream of the endless belt haul-off device 11. Downstream of the cooling trough 12 is a tension sensor device 14 and a rotatably driven take-up drum 15.

As will be seen on referring to FIG. 2, the annealing ovens 10 comprise three tubular ovens 20, each of substantially rectangular transverse cross-section arranged in alignment. Each annealing oven 20 has approximately mid-way between its open ends, an inlet port 21 to which is connected a heater 22. Extending lengthwise throughout substantially the whole length of each annealing oven 20 between the inlet port 21 and the central axis of the oven is a perforated elongate baffle 23. Cold air is fed into each heater 22, where it is heated to approximately 250° C., and hot air from the heater is fed through each inlet port 21 into the annealing oven 20, the perforated baffle 23 effecting turbulence and substantially even distribution of hot air within the oven.

In the preferred method of making an optical cable element of the kind described, an optical fiber F is drawn off the pay-off reel 1 through the tension control device 2, where a controlled tension is applied to the optical fiber and passes through the powder applicator 3, where French chalk is applied to the fiber, into the extrusion machine 4 which extrudes a tube of polyethylene terephthalate around the optical fiber in such a way that the internal diameter of the tube is substantially greater than the diameter of the fiber. On emerging from the extrusion machine 4, the advancing tubed optical fiber is cooled by passing through the cooling trough 5. The internal diameter of the advancing tube is then reduced by drawing down the tube around the optical fiber F by means of endless belt haul-off devices 7 and 9. Drawing down of the extruded tube, heated by passage through the heated water bath 8, causes the molecules of the polyethylene terephthalate to line up longitudinally of the tube and such longitudinal orientation of the molecules imparts desirable properties to the tube. The internal diameter of the tube of the advancing tubed optical fiber emerging from the endless belt haul-off device 9 is such that the tube loosely envelops the optical fiber F. The tubed optical fiber then passes through each of the annealing ovens 20 in turn where turbulent hot air at a temperature of approximately 250° C. effects annealing of the tube. From the annealing ovens 10, the tubed optical fiber passes through the cooling trough 12, which sets the tube, through the closed loop tension control device 14, which controls the motor (not shown) driving the take-up drum 15, and around the take-up drum which is driven at such a speed that the tension in the tubed optical fiber as it is being wound on the drum is maintained substantially constant.

What we claim as our invention is:

1. A method of manufacturing a tube of polymeric material, which method comprises extruding a tube of polymeric material; drawing down the extruded tube of polymeric material to reduce its internal diameter; causing the drawn-down tube to travel in the direction of its length through at least one elongate oven; injecting a gas, which will have no deleterious effect on, and which is at a temperature sufficient to effect annealing of, the drawn-down tube, into the oven at at least one position intermediate of its ends; and directing the injected hot gas on to the advancing drawn-down tube at a plurality of positions spaced along the length of the oven in such a way that turbulent flow and substantially even distribution of hot gas is provided around the advancing drawn-down tube.

2. A method as claimed in claim 1, wherein turbulent flow and substantially even distribution of hot gas around the advancing drawn-down tube is effected by means of an elongate perforated baffle which is positioned between the inlet port through which the hot gas is injected and the advancing drawn-down tube and which extends throughout substantially the whole length of the oven.

3. A method as claimed in claim 2, wherein the drawn-down tube is caused to travel in the direction of its length through at least three elongate ovens arranged in substantial alignment one with another.

4. A method as claimed in claim 3, wherein hot gas is injected into each oven at a position approximately mid-way between its ends.

5. A method as claimed in claim 1, wherein the drawn-down tube is of polyethylene terephthalate and the hot gas is air which is injected into the or each elongate oven at a temperature of approximately 250° C.

6. A method as claimed in claim 1, wherein the drawn-down tube is of polypropylene and the hot gas is air which is injected into the or each oven at a temperature of approximately 180° C.

7. A method of manufacturing an optical cable element comprising extruding a tube of polymeric material loosely housing at least one optical fiber, and annealing the tube by the method claimed in claim 1 or 2.

8. Apparatus for use in the manufacture of a tube of polymeric material comprising an extrusion machine for extruding a tube of polymeric material; means for drawing the extruded polymeric tube from the extrusion machine to reduce its internal diameter; at least one elongate oven downstream of said tube drawing means through which the drawn-down polymeric tube is adapted to pass; a source of gas, which will have no deleterious effect on the drawn-down polymeric tube, connected to the elongate oven intermediate of its ends; means, interconnected between the source of gas and the elongate oven, for heating the gas to a temperature sufficient to effect annealing of the polymeric material of the drawn-down tube; and, within the oven, an elongate perforate baffle which extends throughout substantially the whole length of the oven and which will effect turbulence of the heated gas and substantially even distribution of the heated gas around the advancing drawn-down tube.

9. Apparatus as claimed in claim 8, wherein the source of gas is connected to an inlet port positioned approximately mid-way between the ends of the elongate oven.

* * * * *